(12) United States Patent
Takahashi et al.

(10) Patent No.: US 7,906,020 B2
(45) Date of Patent: Mar. 15, 2011

(54) COOLING MEDIUM FLOW PATH

(75) Inventors: Kazumi Takahashi, Hokkaido (JP);
Masaaki Kinoshita, Hokkaido (JP)

(73) Assignee: Kankyokiki Corporation, Hokkaido (JP)

(*) Notice: Subject to any disclaimer, the term of this patent is extended or adjusted under 35 U.S.C. 154(b) by 152 days.

(21) Appl. No.: 12/316,426

(22) Filed: Dec. 12, 2008

(65) Prior Publication Data

US 2009/0151804 A1    Jun. 18, 2009

Related U.S. Application Data

(62) Division of application No. 10/563,904, filed as application No. PCT/JP2004/008894 on Jun. 24, 2004, now Pat. No. 7,481,924.

(30) Foreign Application Priority Data

Jul. 10, 2003  (JP) ................ 2003-195290
Feb. 24, 2004  (JP) ................ 2004-047549

(51) Int. Cl.
*C02F 1/48* (2006.01)
*B01J 19/08* (2006.01)
*B03C 1/30* (2006.01)
*B03C 1/32* (2006.01)

(52) U.S. Cl. .............. 210/222; 204/155; 422/186.01

(58) Field of Classification Search .............. 210/222, 210/695; 310/54; 204/155
See application file for complete search history.

(56) References Cited

U.S. PATENT DOCUMENTS

| 2,652,925 | A | | 9/1953 | Vermeiren |
| 4,188,296 | A | | 2/1980 | Fujita |
| 4,265,746 | A | | 5/1981 | Zimmerman et al. |
| 4,501,661 | A | | 2/1985 | Karasawa et al. |
| 4,755,288 | A | | 7/1988 | Mitchell et al. |
| 5,009,791 | A | * | 4/1991 | Lin et al. ............ 210/695 |
| 5,055,189 | A | | 10/1991 | Ito |
| 5,149,438 | A | | 9/1992 | Hebert |
| 5,366,623 | A | | 11/1994 | Clair |
| 5,480,557 | A | | 1/1996 | Kawasaki et al. |
| 6,056,872 | A | | 5/2000 | Glass |
| 6,171,504 | B1 | | 1/2001 | Patterson |
| 6,193,878 | B1 | | 2/2001 | Morse et al. |
| 6,277,275 | B1 | | 8/2001 | Yoshifusa et al. |

(Continued)

FOREIGN PATENT DOCUMENTS

EP    1 359 126 A    11/2003

(Continued)

OTHER PUBLICATIONS

JP 2002-180833, Jun. 26, 2002, Yonede et al., JPO IPDL Machine Translation.*

*Primary Examiner* — Burton Mullins
(74) *Attorney, Agent, or Firm* — Holtz, Holtz, Goodman & Chick, PC

(57) ABSTRACT

The present invention provides a cooling medium flow path for improving cooling efficiency of a cooling medium used for liquid-cooling systems for motors, radiators and the like. The cooling medium flow path according to the present invention is capable of increasing cooling efficiency of a cooling medium by providing magnetic members for generating a magnetic force in a direction substantially perpendicular to the flow direction of the cooling medium so that clusters of a liquid, such as cooling water, antifreeze liquid or the like flowing through the flow path may be finely divided or activated.

6 Claims, 19 Drawing Sheets

→ : Flow direction of cooling liquid
N : N pole of magnet
S : S pole of magnet
F : Far-infrared ray-generating stone

U.S. PATENT DOCUMENTS

| | | |
|---|---|---|
| 6,439,207 B1 | 8/2002 | Liu |
| 6,491,825 B2 | 12/2002 | Kamibayashi et al. |
| 7,048,862 B2 | 5/2006 | Fukui et al. |
| 2004/0065625 A1 | 4/2004 | Fukui et al. |

FOREIGN PATENT DOCUMENTS

| | | | |
|---|---|---|---|
| JP | 2-131186 A | 5/1990 | |
| JP | 2-290289 | 11/1990 | |
| JP | 05-293491 A | 11/1993 | |
| JP | 7-204655 A | 8/1995 | |
| JP | 08-155442 A | 6/1996 | |
| JP | 9-98553 A | 4/1997 | |
| JP | 10-314751 A | 5/1997 | |
| JP | 9-271782 A | 10/1997 | |
| JP | 10-277545 A | 10/1998 | |
| JP | 11-22460 A | 1/1999 | |
| JP | 11-333286 B2 | 12/1999 | |
| JP | 3070983 U | 8/2000 | |
| JP | 2001-087774 B2 | 4/2001 | |
| JP | 2001-121154 A | 5/2001 | |
| JP | 2002-143858 A | 5/2002 | |
| JP | 2002-180833 A | 6/2002 | |
| JP | 2004-124918 A | 4/2004 | |
| WO | WO 02/062711 A | 8/2002 | |

\* cited by examiner

PRIOR ART

→ : Flow direction of cooling liquid
N : N pole of magnet
S : S pole of magnet

→ : Flow direction of cooling liquid
N : N pole of magnet
S : S pole of magnet

→ : Flow direction of cooling liquid
N : N pole of magnet
S : S pole of magnet

→ : Flow direction of cooling liquid
N : N pole of magnet
S : S pole of magnet
F : Far-infrared ray-generating stone → : Flow direction of cooling liquid
N : N pole of magnet
S : S pole of magnet → : Flow direction of cooling liquid
N : N pole of magnet
S : S pole of magnet
F : Far-infrared ray-generating stone → : Flow direction of cooling liquid
N : N pole of magnet
S : S pole of magnet → : Flow direction of cooling liquid
N : N pole of magnet
S : S pole of magnet
F : Far-infrared ray-generating stone → : Flow direction of cooling liquid
N : N pole of magnet
S : S pole of magnet → : Flow direction of cooling liquid
N : N pole of magnet
S : S pole of magnet Data of electricity charge reduction at hospital V

|  | Before installation | 1 year after installation | 2 years after installation | 3 years after installation |
|---|---|---|---|---|
| Annual electricity bills (x 10,000 yen) | 392 | 355 | 344 | 295 |
| Reduction rate (%) | — | 9.4% | 12.2% | 24.7% |

Data of gas charge reduction at learning center M

| | Before installation | 1 year after installation |
|---|---|---|
| Annual gas bills (x 10,000 yen) | 274 | 214 |
| Reduction rate (%) | — | 21.9% |

Data of electricity consumption reduction at aged care facilities K

|  | Before installation | 1 year after installation |
|---|---|---|
| Annual electricity consumption (kwh) | 337,452 | 299,772 |
| Reduction rate (%) | — | 11.2% |

Data of kerosene expense reduction at aged care facilities K

|  | Before installation | 1 year after installation |
|---|---|---|
| Annual kerosene consumption (kiloliter) | 48.8 | 33.5 |
| Reduction rate (%) | — | 31.4% |

Data of surface activity evaluation in solubilized amount of salad oil

|  | Tap water | Treated water |
|---|---|---|
| Solubilized amount (mMOL) | 2.26 | 4.55 |
| Percentage change (%) | – | 101.3% |

COOLING MEDIUM FLOW PATH

This application is a divisional of application Ser. No. 10/563,904 filed Jan. 6, 2006 now U.S. Pat. No. 7,481,924, which is a National Phase Application under 35 USC 371 of International Application PCT/JP2004/008894, filed Jun. 24, 2004, which is incorporated herein in its entirety by this reference.

TECHNICAL FIELD

The present invention relates to cooling liquid to be used for liquid-cooling systems for motors, radiators and the like, and more specifically, to a method of improving liquid-cooling efficiency of the cooling liquid.

BACKGROUND ART

A structure of a liquid-cooled motor is described with reference to FIG. 1 (a front view) and FIG. 2 (a side sectional view taken along A-A' section of the front view). The motor rotates with its rotor 107 about its rotation axis 105. Alternating current flows in the rotor 107 and heat is generated due to an eddy current loss based on the alternating current. When the heat generation grows to increase the motor temperature, problems will arise, such as a decrease of generated torque of the motor and an increase of inverter failure rate. As such, cooling liquid is introduced into the motor through cooling liquid ports 101 and circulated through a cooling liquid flow path 103 formed around the motor.

Incidentally, an example of application of such a motor is for electric vehicles. An electric vehicle has an economical advantage that electricity therefore costs less in comparison to gasoline for a current gasoline vehicle. In addition, the electric vehicle has environmental advantages that it emits no exhaust gases such as $NO_x$ and $CO_x$, discharging no causative agents for atmospheric pollution and global warming and is quieter in engine sound than the gasoline vehicle, causing less noise problems.

On the other hand, the electric vehicle has a disadvantage that it cannot get sufficient mobile performance in comparison to the gasoline vehicle. For the electric vehicle, the criterion of practical use is whether it can obtain a mobile performance equivalent to or more than that of the gasoline vehicle by the combination of motor and battery.

In order to solve such problems associated with the electric vehicle, it is considered an important proposition to lengthen travel distances by increasing battery performance and reducing recharging times. Simultaneously, as an elemental technique for realizing that, motors must be reduced in size and weight, improved in performance and durability and reduced in cost.

With this respect, in order to improve motor efficiency and performance, refinement for increasing magnetic flux density of magnets to be used for the motor, refinement for increasing winding density of lead wires, development for methods of controlling inverters and the like are currently under way. Such modifications of designs are necessary, but a huge amount of cost and time for development will be necessary.

When a currently available motor is used for an electric vehicle, problems are that its output is small in relation to battery capacity and motor output is small. For output, when the motor has too high a temperature, its output will further decrease.

A decrease in output will more quantitatively be described. An electric vehicle uses mainly a polyphase induction motor or a permanent magnet-based synchronous motor. When copper lead is used for armature windings, resistance of the copper lead will increase as much as 12% with an increase in temperature of 30° C. Along with this, an induced voltage that is in proportion to a generated torque of the motor will also decrease. When permanent magnets are used for the motor, magnetic flux density will decrease, depending on their material, due to an increase in temperature. For reference, when barium ferrite is used as a permanent magnet material, the magnetic flux density will decrease as much as 5.4% with an increase in temperature of 30° C. Accordingly, the torque will decrease for the same percentage. Due to these factors, some motors may decrease their torques nearly 20% with an increase in temperature of 30° C.

It is also said that a failure rate for an inverter will usually double as the surrounding temperature increases for 10° C. (10° C. law). For this respect, the increase in temperature of the motor must be suppressed to the minimum.

Suppression of increase in temperature of a motor is extremely important for maintaining motor efficiency and minimizing failures. To this end, performance of a motor-cooling system must securely be guaranteed. Otherwise, the temperature of a motor or an inverter for drive control would excessively increase, preventing a wanted output from being obtained at high-revolution, high-output ranges.

To cope with an increase in temperature of a motor, measures are taken currently, such as a combined use with air-cooling, an increase of cooling capacity by enlarging a heat sink for preventing inverter overheating or an increase of cooling capacity per unit time by enlarging a pump for cooling liquid circulation. These solutions will, however, be contradictory to the objectives as described above, such as reduction in size and weight, improvement in performance and durability and reduction in cost for a motor.

On the other hand, water in which water molecules are finely dispersed by a magnetic force for activation (active water) is known. Such active water and treatment processes therefor are disclosed in detail in the following literatures.

Patent literature 1: Japanese Unexamined Patent Publication No. 1993-293491 (in its entirety)

Patent literature 2: Japanese Unexamined Patent Publication No. 1996-155442 (in its entirety)

The active water is highly surface-active, dissolving and permeating and is therefore known for possessing effects such as removing stains very well and inhibiting scale and slime buildup in pipes. Also the active water is in a highly energized state in which electron-exciting action is exerted to actively move electrons and is therefore known for having effects such as being stable because substances contained in a liquid are uniformly present as ions, inhibiting proliferation of aquatic algae and preventing harmful compounds from being produced by ionic bond.

DISCLOSURE OF THE INVENTION

Problems to be Solved by the Invention

The present invention is intended to provide a motor applicable to electric vehicles and the like by the application of active water to the motor to enhance the cooling efficiency thereof.

Means for Solving the Problems

Active water has clusters of molecules that are broken apart and has a higher heat conductivity than when the molecules are aggregated. By applying such active water to a liquid-cooling system of a large-scale, high-output liquid-cooled motor to be used for electric vehicles and the like to finely divide and/or activate clusters of a liquid such as cooling water or antifreeze liquid and so on, the cooling efficiency may be increased. Since the clusters of molecules are small and more uniform in the active water, the load on a circulating pump is greatly reduced so that the flow velocity may be increased and the heat dissipation per unit time may be enhanced.

More specifically, the present invention relates a cooling medium flow path to which magnetic members are provided, the magnetic members generating a magnetic force in a direction substantially perpendicular to the flow direction. The magnetic members are desirably arranged in such a manner that mutually identical magnetic poles may be juxtaposed at a portion where the members are in contact with the cooling flow path. According to an aspect of the present invention, far-infrared ray-generating members for generating far-infrared ray may be provided in conjunction with the magnetic members.

The magnetic flux density generated by the magnetic members according to the present invention is preferably 500 to 5,000 gausses at the center of the flow path. Also, the wavelength of the far-infrared ray generated by the far-infrared ray-generating members is most preferably a wavelength which is absorbed into molecules of the cooling medium and at which the molecules undergo resonance reaction (resonance wavelength). The wavelength of the far-infrared ray is capable of realizing the effect of the present invention when it is deviated by ±10% or so in relation to the resonance wavelength and even if it is 1/N thereof, wherein N is a natural number.

Effect of the Invention

According to the present invention, cooling efficiency of a motor may be improved in a very simply manner and, as a result, performance of the motor may be improved. According to the present invention, a reduction of troubles such as failures of an inverter including a motor, prevention of clogging and contamination of pipes of a liquid-cooling system, a reduction of pump failures, a saving in consumption energy and a reduction of the number of replacements of water or antifreeze liquid and so on can be attained.

According to the present invention, attaching a liquid activator or magnets to the liquid-cooling system of the motor enables to break apart clusters of molecules of a liquid such as water or an antifreeze liquid and so on, and easily replacing a cooling system instead of the motor as a whole enables to improve efficiency, performance, safety and failure tolerance of motor- and inverter-cooling lines. In addition, the load on a pump in the system is greatly reduced to provide a similar result.

According to the present invention, efficient suppression of heat generation of the motor will cause such effects as increasing motor outputs, extending the useful life of the motor, lessening heat losses, decreasing failures, eliminating ununiformness of output and torque and reducing electric power consumption.

Also, according to the present invention, efficient suppression of heat generation of the inverter will cause such effects as extending the useful life of the inverter, increasing motor output, decreasing failures, eliminating ununiformness of output and torque, facilitating controls and reducing electric power consumption.

According to the present invention, flowing of a liquid having small clusters of molecules to greatly reduce the load on the pump will cause such effects as increasing the flow velocity of the cooling liquid to increase the cooling capability, reducing pump failures and preventing stain buildup inside the pipes to extend the useful life and sustain the flow velocity.

According to the present invention, the frequency of cooling liquid replacement is greatly reduced and the apparatus can be used semipermanently because it is composed of only permanent magnets or of permanent magnets combined with far-infrared ray-generating stones. It can therefore be used repeatedly if it would be formed as a detachable unit.

Even if not all of these effects are comprised, it is still, of course, within the range of the present invention.

BEST MODE FOR CARRYING OUT THE INVENTION

FIG. 3 shows a cooling system to which the present invention is applied. In this cooling system, a liquid-cooled motor 1, an inverter 2, a circulating pump 3 and a heat exchanger 4 are connected through a cooling liquid path 7. The circulating pump 3 acts as a pump for circulating cooling liquid and the heat exchanger 4 acts to cool the cooling liquid with its temperature increased. The cooling liquid flowing along the cooling liquid path 7 is supplied to the liquid-cooled motor 1 and is responsible for cooling the same.

According to the present invention, a liquid activator 5 using magnets or the like is provided somewhere along the cooling liquid path 7. As to be subsequently referred to, the liquid activator 5 acts to segregate clusters of water molecules from one another by a magnetic force and is means for activating water. As shown in FIG. 3, the liquid activator 5 is provided immediately before the liquid-cooled motor 1. It will be however sufficient if the liquid-cooled motor 1 is supplied with water once activated by the liquid activator 5 as fully activated, so that the liquid activator may not necessarily be provided immediately before the liquid-cooled motor 1. Locations at which the liquid activator 5 may be provided include those before and after the inverter 2, those before and after the circulating pump 3 and those near the exit of the liquid-cooled motor 1. Locations of the liquid activator 5 in the cooling liquid path 7 do not comprise an indispensable constituent feature of the present invention.

According to the present invention, a unit of unipolar or multipolar magnets or a unit of unipolar or multipolar magnets on which far-infrared ray-generating stones are placed or coated is mounted at a desired location along the cooling liquid path 7 through which a liquid for the liquid-cooling system of the motor, such as water or an antifreeze liquid and so on, is flowed. According to the present invention, the liquid activator 5 may be mounted to a path for a cooling medium in the motor.

In addition, according to an embodiment of the present invention, no matter how the term "liquid activator" is referred to, any means for segregating clusters of water molecules from one another by a magnetic force may be used. For details of configuration of such activating means, reference may be made to the embodiments to be subsequently referred to.

The present invention consists in sub-dividing or sub-dividing and activating clusters of water molecules for use in cooling a motor. A variety of methods for sub-dividing or sub-dividing and activating the clusters of water molecules are available and any methods may be used as long as such water, antifreeze liquid or the like may be obtained.

The finely divided or finely divided and activated states of the clusters of water molecules according to the present invention have a duration of favorable state depending on the method for sub-dividing and the like therefor. Thus, subdividing or sub-dividing and activating may desirably be carried out on a continuous basis in a cooling liquid path system.

EXAMPLES

Embodiments of magnetic members, such as magnets, for generating a magnetic force to be used in the present invention will be described.

A first embodiment is shown in FIG. 4. This figure represents a manner in which unipolar magnets are mounted at any location where water or antifreeze liquid and so on flows in a liquid-cooling system for a motor. With reference to FIG. 4, arrows represent the flow direction of cooling liquid and "N" denotes the N pole of a magnet while "S" denotes the S pole of the magnet (here and hereinafter).

A second embodiment of magnetic members according to the present invention is shown in FIG. 5. This figure represents a manner in which multiple multipolar magnets are mounted along a cooling liquid path. As shown in FIG. 5, adjacent magnet units are desirably mounted with their N poles and S poles in an alternate fashion.

FIG. 6 shows a variant of the second embodiment. This embodiment also represents a manner in which multiple multipolar magnet units are mounted along a cooling liquid path, but differs from the embodiment of mounting in FIG. 5 in that adjacent magnet units are aligned with their polarity.

A third embodiment of magnetic members according to the present invention is shown in FIG. 7. Unlike the first and second embodiments, this embodiment uses far-infrared ray in conjunction with a magnetic force to disperse clusters of water molecules. As shown in FIG. 7, far-infrared ray-generating stones (denoted as F) are provided in juxtaposition with magnets.

Far-infrared ray is absorbed by molecules of a cooling medium, thereby giving them energy and causing resonance reaction to oscillate the molecules. In this way, the far-infrared ray excites the molecules to a highly energized state to make them susceptible to the effect of magnetic force, with a result that the clusters of the water molecules will more easily be broken apart and remain as such for a longer period of time.

FIG. 8 shows a variant of the third embodiment. In this embodiment, unlike the embodiment of FIG. 7, far-infrared ray-generating powder (shown as hatched) is applied to magnets. Application of the far-infrared powder may be carried out by coating, pasting and other appropriate measures. In this way, an equivalent effect to that of the embodiment of FIG. 7 may be exerted.

A fourth embodiment of magnetic members according to the present invention is shown in FIG. 9 to FIG. 13. The fourth embodiment is a combination of the second and third embodiments. Specifically, multiple magnets are arranged along a cooling liquid path as in the second embodiment and simultaneously far-infrared ray-generating powder or far-infrared ray-generating stones are arranged along the cooling liquid path on the basis of the third embodiment (without limitation thereto).

FIG. 9 shows an embodiment in which multiple magnets are arranged with their N and S poles in an alternate fashion and far-infrared ray-generating stones are arranged in juxtaposition.

FIG. 10 shows an embodiment in which multiple magnets are arranged with their N and S poles in an alternate fashion and far-infrared ray-generating powder is applied. Application may be carried out by coating, pasting and other appropriate measures.

FIG. 11 shows an embodiment in which multiple magnets are arranged with their N poles and S poles respectively in a line and far-infrared ray-generating stones are arranged in juxtaposition.

FIG. 12 shows an embodiment in which multiple magnets are arranged with their N poles and S poles respectively in line and far-infrared ray-generating powder is applied. Application may be carried out by coating, pasting and other appropriate measures. FIG. 13 shows an embodiment in which refinement and arrangement are made to have a combination of features of FIG. 10 and FIG. 12.

The first to fourth embodiments are mounted in such a manner that magnetic flux or far-infrared ray preferably traverses the flow direction of a liquid substantially perpendicularly, to finely divide or finely divide and activate water or antifreeze liquid and so on in the liquid-cooling system. Depending on uses, however, the magnetic flux or far-infrared ray may not necessarily be perpendicular to the flow direction of the liquid as long as the effects are obtainable. In this respect, adjustment can be made as appropriate in accordance with space and process for mounting the magnetic members.

For further describing arrangement of the magnets as the magnetic members, arrangement in which N and S poles are oppositely placed in pairs in such a manner that they sandwich a pipe in-between comes into consideration for unipolar magnets only, while arrangement in which N and S poles are arranged in an alternate fashion along one side and S and N poles are arranged in an alternate fashion along the opposite side (FIG. 5, FIG. 9, FIG. 10 and FIG. 13) or arrangement in which N poles are arranged along one side and S poles are arranged along the opposite side (FIG. 6, FIG. 11, FIG. 12 and FIG. 13) come into consideration for multipolar magnets. The arrangement according to the latter is directed to increase the magnetic flux density due to repulsion between the same poles by arranging the magnets at a certain interval. As an interval between magnets, theoretically ($\frac{1}{6}$) L is most suitable, wherein L represents thickness of a magnet as shown in FIG. 6 and FIG. 13. It was however found that a range of ($\frac{1}{12}$) L to ($\frac{1}{2}$) L is practically sufficient and that the magnetic flux density triples at the maximum by repulsion between the magnets.

In each of the embodiments, the magnetic flux density at the center of a pipe is approximately 500 to 5,000 gausses in order to exert the effect of the present invention. The magnetic flux density at the center of a pipe may be determined by well-known methods. One of such well-known methods is to place a gaussmeter at the center of a pipe. It is considered that densities of around 1,000 to 4,000 gausses are preferable and densities of 2,000 to 3,000 gausses are more preferable. At such magnetic flux densities, a magnetic force modifies physical properties of water to the greatest degree.

In addition, when the present invention is applied to water, the effect of the present invention may be exerted with far-infrared ray of wavelengths of 5 to 25 micrometers. Wavelengths of 6 to 18 micrometers are more preferable and wavelengths of 8 to 14 micrometers are even more preferable. Wavelengths in these ranges are easily absorbed in water molecules and are capable of oscillating the water molecules to create a highly energized state.

When a medium other than water is used as a cooling medium, preferable ranges of far-infrared ray wavelengths will vary. Specifically, depending on the natural frequency of molecules of a cooling medium to be used, far-infrared ray-generating stones and the like having wavelengths which are absorbed in the molecules of the cooling medium to cause the molecules to undergo resonance reaction (resonance wavelength) must be chosen. Wavelengths of the far-infrared ray of far-infrared ray-generating stones adopted may exert the effect of the present invention if they are deviated by ±10% or so from the resonance wavelength and if they are 1/N thereof, wherein N is a natural number. Flow velocity of media (liquid, gaseous) may be 0.01 m/sec to 10 m/sec to exert the effect of the present invention. Flow velocities of 1 m/sec to 5 m/sec are considered preferable and flow velocities of 2 m/sec to 4 m/sec are considered more preferable.

When the magnetic members according to the present invention are incorporated into finished products, such as motors, the number of poles may be altered depending on measurement of effect on cooling systems, performance requirement and allowable cost, or stones for generating far-infrared ray for activation may be placed or coated. Applications of water having small clusters or water having small clusters and having been activated, such as magnetized water or active water and other cooling media as well as media for heat exchanges such as heating or vaporization to mechanisms in need of heat exchanges such as heating and vaporization, including cooling, such as motors and radiators are within the range of the present invention. Examples of such applications will subsequently be referred to.

The term "water having small clusters" is used herein. Clusters can be structurally analyzed by, for example, a nuclear magnetic resonance (NMR) apparatus. For structural analysis of clusters, an analyte is first applied with a magnetic field having a frequency substantially equal to the resonance frequency to determine a gain. The gain being plotted along the ordinate axis and the frequency being plotted along the abscissa axis, the gain reaches its peak at the value of the resonance frequency. From the half value width of this peak (line width value at ½ peak level of gain) the ratio of movement velocity of water molecules may be given. Smaller the half value width, greater the movement velocity of the clusters to be analyzed, which means the clusters are smaller.

For example, typical tap water has a value of approximately 100 to 150 Hz as determined by NMR as described above. On the other hand, after treating such tap water with magnetism or with magnetism and far-infrared ray, the value is determined as approximately 50 to 70 Hz. This means that the clusters of water molecules are broken apart by treatment with magnetism or with magnetism and far-infrared ray.

As methods for obtaining water having small clusters of water molecules, such as active water, uses of magnetic field lines and far-infrared ray (ceramic) are disclosed herein. Other methods however include those based on electromagnetic waves, laser beams, weak current, high voltages, ultrasonic waves, impact and forces and it is also within the range of the present invention to use or combine such other methods. Since the finely divided or finely divided and activated forms of clusters of water molecules have a duration, such treatments are preferably carried out continuously in the system. Since it is supposed that the most favorable activated state will last eight hours or less and favorable activated state will last approximately 48 hours when a magnetic force and far-infrared ray are exerted, circulation may desirably be carried out in a duration of eight hours or less.

According to the present invention, coating multipolar magnets arranged in such a manner that the magnetic flux density at the center of a pipe may be 2,000 to 3,000 gausses with a powdered substance for generating far-infrared ray of 8 to 14 micrometers, such as tourmaline and black silica, is an example of the most preferable embodiment.

Examples of magnets which may be used for the present invention include samarium-cobalt magnet, neodymium-boron magnet, alnico magnet, praseodymium magnet, strontium-ferrite magnet, barium-ferrite magnet, other rare earth-based magnets and ferrite-based magnets. Examples of far-infrared ray-generating substances which may be used for the present invention include tourmaline, black silica, zeolite, talc, ceramics in general and substances containing $SiO_2$ in part of their compositions.

Such examples were designed according to the fourth embodiment and applied to a cooling system for motors to experimentally determine rises in temperature. In the experimental determinations, a liquid-cooled induction motor with an output of 40 W was continuously run unloaded at 4,000 rpm and the temperature inside the motor was measured. The liquid activator provided for the occasion was according to the embodiment in FIG. 12, with a magnetic flux density at the center of the pipe of 2,500 gausses and a wavelength of the far-infrared ray of 8 to 14 micrometers, using tap water for the cooling liquid. The flow rate of the cooling liquid was preset at 6 l/min and the flow velocity was preset at 2 m/sec. As a result, the temperature rise for the product without measures was 10° C. while the temperature rise for the product with measures was suppressed to 7.2° C. It may be concluded that the cooling efficiency was improved approximately 30%.

The results of the experiments conducted to support the above will be shown below.

FIG. 14 shows an apparatus 10 wherein a predetermined amount of heat energy per unit time was supplied by an electric heater 11 to three kinds of water with agitation by agitator 15 and temperature rises measured with thermometer 12. Tap water 20 is contained in beaker 14 surrounded by insulator 13. Using the experimental apparatus 10 as shown in FIG. 14, times required for (1) tap water, (2) tap water treated only with multipolar magnets (treated water A) and (3) tap water treated with multipolar magnets and far-infrared ray (treated water B) to rise in temperature for 30° C. were determined. The results are shown in FIG. 15.

Multiple experiments were conducted to provide an average. As seen from FIG. 15, the magnetized water and the active water rise in temperature more quickly than the tap water. It was found that the active waters (cooling medium treated by magnetization and cooling medium treated by magnetization and far-infrared ray) have higher heat conductivities. When they are used as cooling media, the cooling efficiency will improve.

FIG. 16 shows the results of the measurements as to how long it takes to pump up 3 $m^3$ of (1) tap water, (2) tap water treated only with multipolar magnets (treated water A) and (3) tap water treated with multipolar magnets and far-infrared ray (treated water B) using an FSS swirl pump of bipolar type with an output of 3.7 kW with two water tanks.

Multiple experiments were conducted to provide an average. The treated water A was treated through a PVC pipe of φ25 to which magnets were placed according to the second embodiment (embodiment shown in FIG. 6) under the condition of a magnetic flux density at the center of the pipe of 2,000 gausses. The treated water B was magnetized through a PVC pipe of φ25 to which magnets were placed according to the fourth embodiment (embodiment shown in FIG. 12) under the condition of a magnetic flux density at the center of the pipe of 2,000 gausses and was also treated with far-infrared ray having wavelengths of 8 to 14 micrometers.

As shown above, the results obtained show that the cooling medium treated only with multipolar magnets improves the cooling efficiency for 20 to 30% and the cooling medium treated with multipolar magnets and far-infrared ray improves the cooling efficiency for 40 to 50%.

In addition, the present invention is applicable to any industrial machines in which cooling, heating, vaporization and heat insulation are provided by any kind of media (liquid, gaseous) for heat exchanges of water, oils, cooling fluids and the like, for example, various types of mechanical pressing machines, hydraulic pressing machines, bending machines, shearing machines, wire rod machines, machining centers, turning centers, drilling centers, grinding machines, slotters, planing machines, cutters, milling machines, electroerosion machines, lathes, drilling machines, boring mills, specialized machines for modular units, automatic assemblers, special processing machines, laser beam machines, electrolytic machines, mold polishers, polishing machines, finishers, forging machines, casting machines, forge rolling machines, rolling machines, mold forming machines, die casting machines, liquid material injection molding machines, thermoplastic injection molding machines, thermosetting injection molding machines, rubber injection molding machines, special injection molding machines, reaction injection molding machines, vacuum forming machines, blow forming machines, vacuum casting machines, compression molding machines, thermoforming machines, foam molding machines, extruders, extrusion molding machines, centrifugal molding machines, textile machines, papermaking machines, paper converting machines, bookbinding machines, wind force machines, iron making machines, machines for mines, mechanical shovels, excavators, machines for heating, machines for cooling, air conditioners, pumps, pumps for liquids, centrifuges, printing machines, heat pumps, cooling towers, concentrators, crystallizers, dryers, crushers, agricultural machines, electricity generators, compressors, separators, filters, drivetrains, cargo carriers, transmissions, oiling equipment, power generators, elevators, automatic segment assemblers, engines, jet engines, turbo chargers, automobiles, trucks, forklifts, special-purpose vehicles, transport machines, distribution equipment, hydraulic shovels, unloaders, cranes, conveyors, autoways, construction machines, military defense aircrafts, commercial aircrafts, guiding instruments, outer space instruments, ships, industrial furnaces, vacuum furnaces, nuclear reactors, blast furnaces, turbines, boilers, ventilation fans, robots, computers, semiconductors, washers, precision component washers, food packaging machines, electronic devices, pots, humidifiers, aspirators, carburetors, air conditioners, refrigerators, freezers, freezing machines, practical refrigerators, HVAC equipment, freezers for transportation, air conditioners for vehicles, medical devices and so on.

Efficiency of heat exchanges such as heating and vaporization, including cooling of machines will thereby improve so that performance of the machines may be improved and troubles such as failures may greatly be reduced. In addition, the load on pumps and the like to be used for circulation and feeding may be reduced so that energy expenses may be reduced.

By the application of the present invention, red rusts, stains and clogging in the pipes, heat exchangers, pumps, machines and apparatuses through which media (liquid, gaseous) pass are eliminated to thereby increase the flow velocity so that efficiency of heat exchanges such as heating and vaporization, including cooling may further be increased and the load on the pumps may be reduced, allowing the useful lives of the heat exchangers, pipings, machines and apparatuses to be extended.

According to the present invention, proliferation of bacteria and buildup of scales and slimes in the media (liquid, gaseous) may be suppressed so that useful lives of the media may be extended and frequency of replacements may be reduced. By the application of the present invention, the energy for heating, vaporizing and cooling the media (liquid, gaseous) may also be saved.

In machines having engines which operate on fuels, such as automobiles, by the application of the present invention to a bundled combination of a pathway through which a medium for heat exchanges, such as cooling, heating and vaporization passes and a pathway through which a fuel passes, fuel consumption improves for 10 to 30% according to data and more efficient energy saving is achieved.

In so doing, when the media (liquid, gaseous) for heat exchanges, such as heating and vaporization, including cooling are circulated for use, the mounting location may be anywhere in the circulation system as described above. An example is shown in FIG. 17.

201 denotes a magnetic member according to the present invention, 202 denotes a heat exchanger, 203 denotes a pump and 204 denotes a machine, an apparatus or a part thereof in need of heat exchanges for its mechanical movable components and the like.

If circulation is not allowed, it may preferably be mounted at a stage preceding an apparatus for feeding, such as a pump. If processes for previously cooling, heating and vaporizing the media (liquid, gases) are involved, it should more desirably be mounted at a stage also preceding such processes, because the energy required for the processes may be reduced. An example with a machine tool is shown in FIG. 18.

301 denotes a magnetic member according to the present invention, 302 denotes a heater, cooler or vaporizer, 303 denotes a pump, 304 denotes a tank for medium, 305 denotes a cutting machine and 306 denotes a workpiece.

Experiments for temperature rises were carried out for several of these industrial machines. Under the conditions of the fourth embodiment (embodiment shown in FIG. 12) with diameters of pipes differing from φ8 to 25, the magnetic flux density at the center was adapted to be 2,000 gausses or more. Also, wavelengths of the far-infrared ray ranged from 8 to 14 micrometers. As a result, suppression of temperature rise of 10 to 50% was observed as in the case of motor.

The present invention is also applicable to facilities per se using water or media (liquid, gaseous) for heating, vaporization and heat exchanges including cooling, such as cooling, heating and air conditioning systems, hot water supply systems, boilers, heat exchangers, drinking water supply systems, lavatories, rest rooms, hot springs, swimming baths, baths, showers, water works, fountains, heated swimming pools and swimming pools; buildings having such facilities, such as hospitals, hotels, inns, condominiums, golf courses, public housings, corporate dormitories, student dormitories, schools, libraries, community centers and other public facilities; plants, equipment, factories, installations and other constructs; tankers, passenger boats, freight vessels, specialized ships, combined carriers, special ships, military vessels, repair ships, ferries, tugboats and other ships as well as vehicles such as military defense aircrafts, commercial aircrafts, campers, buses, limousines and so on.

Examples of plants include gas and petroleum production plants, desalination plants, nuclear fuel processing plants, combined cycle plants, thermopower plants, nuclear power plants, geothermal plants, gas turbine power plants, wind power plants, photovoltaic power plants, thermal energy conversion plants, diesel power plants, critical pressure power plants, waste power plants, oxygen combustion plants, supercritical water plants, water heat treatment plants, LNG/LPG storage plants, LNG/LPG receiving plants, cement plants, natural gas plants, chemical plants, petrochemical plants, pharmaceutical plants, waste disposal plants, waste recycling plants, water treatment plants and all other industry-related plants.

Examples of facilities include flood control facilities, water utilization facilities, water distribution facilities, water conveyance facilities, drainage facilities, storage facilities, grinding facilities, environmental facilities, aerodynamic experiment facilities, training aquarium facilities, engine experiment facilities, hydraulic experiment facilities, various experiment facilities, flue gas denitrification facilities, flue gas desulfurization facilities, noise control facilities, garbage accumulation drum facilities, garbage longitudinal conveyance facilities, garbage crushing facilities, dam-related facilities and other industrial facilities.

Further, as factories and the like, food factories, medical device factories, semiconductor factories, electronic device factories, part factories, brewing factories, beer factories, papermaking factories, fine chemicals factories, liquid crystal factories and factories for all industrial products are included.

Also included are water treatment plants, water and sewage plants, waste disposal sites, marine facilities, port facilities, marine production facilities, leisure facilities, guest accommodating facilities, resort facilities, hot spring facilities, bathhouses, public baths, cultural facilities, sports facilities, swimming pools, heated swimming pools, aquariums, incinerators, ash fusion furnaces, distilleries, breweries, sake breweries, gasification fusion systems, waste disposal sites, refuse-derived fuel production systems, refuse power generation systems, biogas recovery systems, garbage disposers, recycling facilities, air pollution control systems, soil remediation systems, hangar dock systems, rocket propulsion systems, desulfurization units, service areas, highways, various roadways, bridges, heat exchange systems, welding systems, dams, cultivation areas, fish farms, farmsteads, agricultural plantations, PVC greenhouses, dust collection systems, substation systems, concrete pumps, parking towers and parking facilities.

By the application of the present invention thereto, elimination of clogging, scales, slimes and red rust buildup in pipes, pumps, equipment and machines and extension of their useful lives may be allowed for.

In addition, the reduction of the load on the power of pumps greatly reduces the energy used and extends the replacement cycle two times to more to greatly save maintenance cost. Expense for fuel for heating media including water by a boiler and the like and electricity expense for control are greatly reduced and clogging is eliminated to greatly reduce failure rate. In boilers and the like in particular, pure water must be used or systems for demineralizing industrial water such as groundwater and tap water are needed. By the application of the present invention, however, metal ions and chlorine ions are prevented from bonding and depositing in the machines to decrease the efficiency or cause failures, so that such measures are no longer needed. Clogging in cooling towers, chillers and the like is eliminated to greatly improve the heat exchange efficiency and greatly extend their useful lives. In other air conditioning facilities, efficiency of heat exchanges is improved and clogging is eliminated so that the energy for feeding for pumps and like may greatly be saved.

In addition, the energy for heating water, such as for boiling water or for cooking, in buildings, facilities, plants, factories and vehicles may be saved.

By way of illustration, hotels, inns, golf courses, resort facilities, health farms, bathhouses and the like have swimming baths where bathwater is circulated and pollution is removed before sterilization. As methods for sterilization, those using ultraviolet ray and chlorine dioxide are recently prevailing due to problems concerning *Legionella* bacteria and *Cryptosporidium*. In such cases, however, sterilization may be achieved, but scales and slimes may build up in pipings of the circulation systems and facilities. By the application of the present invention, such buildup may be inhibited and the effect of sterilization may further be enhanced. Data show that 50% of bacteria are inactivated in pure water that has been treated with the present invention.

Further, since stains are easily removed, the amount of water to be used for washing, laundry, dishwashing, showering, bathing and the like is greatly reduced.

When the water is used as drinking water, various benefits as active water, such as of infiltrating into the cells to promote metabolism, removing stains easily, being tasty, having mellow flavors, rendering foods tasty, providing warm bath effects, smoothing the skin, prolonging lives of cut flowers, having no chlorine smells, being less perishable and being more quickly boiled may be enjoyed.

In this context, as examples of industrial applications, effects in use such as of inhibiting water contamination and bacteria proliferation in transportation of live fish to reduce fatality, improving flavors and mellowing tastes in sake brewing, fluffing out breads in baking and greatly reducing cooking time in rice steaming are mentioned.

In so doing, when the media (liquid, gaseous) for heat exchanges such as heating and vaporization, including cooling are circulated for use, the mounting location may be anywhere in the circulation system as described above. An example of installation in a cooling system for a building or the like is shown in FIG. 19.

401 denotes a magnetic member according to the present invention, 402 denotes a heat exchanger, 403 denotes a pump, 404 denotes pipes passing through a building, 405 denotes a building and 406 denotes a cooling tower.

If circulation is not allowed, it should be mounted at a stage preceding an apparatus for feeding, such as a pump.

If processes for heating and cooling the media (liquid, gaseous) for heat exchanges such as heating and vaporization, including cooling are involved, it should desirably be mounted at a stage also preceding such processes.

In case of a building, it often has water tanks or elevated water tanks for pooling water and in such cases, it is necessary that circulation systems comprising the present invention are created in such tanks and circulation is continuously made to keep the water in the tanks as activated. Since it is supposed that the most favorable activated state will last eight hours or less and favorable activated state will last approximately 48 hours, circulation may desirably be made in a duration of eight hours or less. An example of installation in a water tank for a building is shown in FIG. 20.

501 denotes a magnetic member according to the present invention, 502 denotes a circulation pump, 503 denotes a water tank, 504 denotes pipes leading to an elevated water tank installed on top of a building and 505 denotes a lifting pump.

Also, data of electricity charge reduction for a hospital V are shown in FIG. 21. The present invention was applied in such a manner that water pooled in a water tank was circulated as in FIG. 20 and the water was magnetized through a PVC pipe with $\phi 32$ to which magnets were placed according to the fourth embodiment (embodiment shown in FIG. 12) under the condition of a magnetic flux density at the center of the pipe of 2,000 gausses and was also treated with far-infrared ray having wavelengths of 8 to 14 micrometers.

Circulation cycles are programmed in such a manner that 20 tons of water will pass through the present invention three to five times a day, since these facilities use 20 tons of water a day. In this way, water is continuously treated every eight hours or less to be maintained as activated all the time.

Experiments have shown that sufficient effects may be obtained by the installation of the present invention only in water tanks, despite the fact that ordinary buildings also have elevated water tanks installed in combination with the water tanks. Therefore, the minimum expense is needed for the installation. In other words, by the application of the present invention to buildings, the problems that have traditionally been associated with such buildings may very inexpensively be solved and the expense for maintenance and the utility charges may easily be reduced.

As seen in this figure, reduction rates are increasing each year. It shows that stains inside the pipes and instruments are gradually being removed. The rates will converge in the course of approximately three years and level off thereafter.

In addition, most of the reduction in electricity is derived from the electricity for driving pumps for feed and circulation. The pump for feed will have its load reduced only by the modification of water to save the electricity. The reduction rate is considered close to approximately 9.4% at the first year. Also, the proportion of pump-related electricity out of the whole electricity consumed for a typical building is approximately 25 to 30%. Therefore, it is assumed with respect only to pumps that the electricity consumption is reduced for approximately 28 to 37% by the activation of water. In addition, it is predicted that, for a newly constructed building where pipes are clean inside, approximately 10% of the whole electricity consumption is saved by the application of the present invention.

FIG. 22 shows reduction rates of electricity consumption when the present invention is applied to water tanks in a building of an aged care facility Y under the same conditions as in FIG. 21. Again, the reduction rate is seen approximately 10% at the first year. For several thousand cases of installations, reduction rates are 10 to 30%.

Next, data of gas charge reductions when the present invention is applied to water tanks in a learning center M under the same conditions as those of the two previous examples are shown in FIG. 23. In this learning center, water from the water tanks is supplied to boilers for use in room heating and hot water supply. In so doing, the boilers are used for boiling active water so that gas charges may be reduced. Simultaneously, electricity charges for controlling the boilers will also be reduced. As shown in the figure, a reduction of 21.9% was obtained for the first year. Also, data have shown a reduction of more than 40% partway through the second year. This is attributable to the fact that calcium chloride and the like built up in the boilers gradually detach, further improving heat conductivity. For the boilers, fuel is saved for 20 to 50%.

Therefore, by mounting the present invention to water tanks, electricity charges for pumps and the like, fuel charges for boilers and the like, fuel charges for boiling hot water and tap water charges may be reduced altogether.

In addition, if a building has a cooling line, coolant or water can only be replaced several times a year because it is operated as hermetically sealed. Therefore, benefits may not be enjoyed if the present invention is mounted to a water tank. In that case, by mounting the present invention independently to a circulation system of the cooling line, energy may be saved in the same manner (See FIG. 19). In the cooling line, the coolant deteriorates due to heat so that scales may tend to build up in the pipes, and silica in a pipe cleaner deteriorates and agglomerates to stick inside the pipes. In addition, clogging is likely to occur due to calcium chloride contained in the coolant and water, seriously decreasing the efficiency. A decrease of around 30% is likely to occur in the course of several years. By the installation of the present invention, deposits will detach and the building will be restored nearly as new-built.

Next, as an example of determining reduction rates for electricity charges for pumps and fuel charges for boilers (kerosene charges) altogether, data for an aged care facility K are shown in FIG. 24 and FIG. 25. The present invention was again mounted to water tanks in this building under the same conditions as described above. Reduction rates of 11.2% and 31.4% are shown respectively.

To add, ideally, instead of mounting to individual buildings, facilities or the like, by mounting to the mains of water lines of the area, the benefits of the present invention can be enjoyed throughout the area so that the area where maintenance expense and energy consumption are reduced may be competitive in terms of cost.

NMR measurements of water drunk in communities of longevity are as low as 65 to 90 Hz and such water is supposed to have small clusters as if it were treated by the present invention. That is then supposed to be a cause of longevity. Therefore, one of the effects of active water is related to the activation of metabolism and it may be safe to say that health is promoted and medical expenditure is reduced as in the communities of longevity.

These benefits may be considered advantageous for attracting firms and plants to that area.

Also, the present invention is applicable to car washes. Thereby, such problems associated with conventional car washes as that water scales and stains are difficult to remove and that flow paths (pipes) for hot water (water), detergent and wax are clogged may be solved. In other words, since active water has very high surface activity, solvency power and permeability, it is capable of very successfully removing water scales and stains for which car washes are intended. In this regard, experiments were repeatedly conducted on buses and passenger cars to visually observe clear differences in efficacy.

However, visual ratings are not included in the items of ratings for cleaning according to JIS and, therefore, ratings must be based on the degree as to how much oil content can be washed off. According to the experiments carried out with a salad oil, the amount of solubilized oil doubled on an average as shown in FIG. 26 and, therefore, it is considered that the surface activity almost doubled with an obvious effect. For experimentation, tap water and the same tap water that was treated through a PVC pipe of $\phi 25$ provided with magnets according to the fourth embodiment (embodiment shown in FIG. 12) under the conditions of a magnetic flux density of 2,000 gausses at the center of the pipe and infrared ray of 8 to 14 micrometers, as treated water, are provided. Then, 50 microliter of 10 mM TSP-d4 deuterium hydrogen oxide solution is added to an NMR sample tube of $\phi 5$, to which 450 microliter of the tap water or the treated water for experiment and one microliter of salad oil are added to a final concentration of 1 mM. The sample tube is shaken well for one minute and left for five minutes before measurement by an NMR measuring apparatus. Ten measurements were made to give an average.

Also it is miscible very well with detergent and foams well so that stains and water deposits can be removed by a synergistic effect. Nevertheless, the foams can be rinsed quickly so that less heated water (water) is needed for washing away. For these reasons, the amounts of detergent and water may be reduced and simultaneously wax may be spread well and reduced in amount used because the stains have been removed well. In other words, chemicals having influences on the environment may be reduced.

In addition, clogging of pipes through which heated water (water), detergent and wax pass may be eliminated for the same reasons. Further, since active water has high heat conductivity, energy required for obtaining heated water to be used in the car washes may be reduced.

Also, since clusters of molecules are smaller and more uniform, the load on feed pumps will be very small and since no clogging occurs, flow may be accelerated or energy consumption may be reduced. In addition, the whole apparatus including the pumps will have an exceptionally low failure rate.

Usually, after a use of a car wash, water scales and stains that may not completely be removed have to be removed by a process of manual operations. According to the present invention, since the stains may be removed exceptionally well, such a process may be shortened and since the occurrence of manual operations may drastically be decreased, washing time per car may be shortened. This will fit in with the requirement on the market such that no one wishes to be waiting in line. In other words, the number of cars washed per unit time will increase and, thus, profitability will increase accordingly.

In so doing, the mounting location may preferably be at a stage preceding an apparatus for feeding, such as a pump, depending on the space requirement. However, a typical car wash has a structure such that water, detergent and wax are contained in respective tanks. Since the detergent is diluted with water and the wax is also water-soluble, in order to prevent clogging of pipes, the present invention should most effectively be mounted at where the three paths for water, detergent and wax are bundled. An example of such an embodiment is shown in FIG. 27.

In FIG. 27, 601 denotes a magnetic member according to the present invention, 602 denotes a water tank, 603 denotes a pump for feeding, 604 denotes a tank for detergent and 605 denotes a tank for wax. Cars are to be washed further left out of the figure.

In cold climates and regions, since a process of heating and boiling water for injection is often involved, the present invention is to be installed before such a process or since a system often has a reservoir, a circulation system comprising the present invention is to be installed in such a reservoir and circulation is continuously to be made to keep the water in the reservoir as activated. An example is shown in FIG. 28.

In FIGS. 28, 701 and 708 denote magnetic members according to the present invention, 702 denotes a pump for circulation, 703 denotes a pump for feeding, 704 denotes a tank for detergent, 705 denotes a tank for wax, 706 denotes a tank for water and 707 denotes a heater. Cars are to be washed further left out of the figure.

In addition, the present invention may be incorporated in simplified water purification systems to be installed for improvement in water circumstances in developing nations and in emergencies such as natural disasters, warfare and conflicts.

By such incorporation, elimination of clogging in pipes for pipelines and buildup of scales, slimes, red rusts, stains and the like as well as extension of their useful lives may be allowed for. In addition, by the reduction of the load on pumps for pumping up and feeding, energy may greatly be saved and exchange cycles may be extended to greatly reduce maintenance cost. This is highly preferable for the locality where energy circumstances are considered demanding as a matter of course.

In addition, some data have shown that active water inactivates approximately 50% of bacteria so that sterilized water may further be preserved and drinking water having a longer lasting sterilization effect may be supplied. It is also advantageous in that the installation is simple and needs less space.

The system setup first pumps up underground water and the like by a pump and/or pumps up water from a river. The present invention is desirably located before a pump for reducing the load on the pump, however depending on the quality of the water pumped up. Next, salts, for example, are electrolyzed to produce chlorine dioxide and the like and they are then passed through a sterilization apparatus, such as a method of low concentration so as not to do any harm to the human body and conveyed to a remote location through a pipeline by a pump for feeding. It is desirable to mount the present invention every two kilometers in view of the continuance of the effect of the active water. By this way, good quality of drinking water may be carried to a distant extremity in a very simple manner.

By combining this with a simplified high efficiency hydroelectric power generator or the like for generating electricity by circulating water constantly through a flow path, a system that is suitable for improvement of areas where electricity and water circumstances are unfavorable may be created. An example is shown in FIG. 29.

In FIGS. 29, 801, 811 and 812 denote magnetic members according to the present invention. First, river water or underground water denoted as 810 is pumped up by a pump 802 and passed through a grit chamber and filtering tank 809. It is then pumped up by a pump and activated by the present invention 811 before being fed to a sterilizing tank 808. It is there sterilized by chlorine dioxide or ultraviolet ray to be fed by a pump 803 out to a transit tank 807. Activation is carried out every two kilometers by the present invention before feeding to the last distribution tank 805. In this last distribution tank, 804 is circulated by a circulation pump and activated through the present invention 812. 806 is a water outlet. Activation may be carried out only in the last distribution tank if no consideration is made for electricity consumption by the pumps along the way and for enhancement of effects of sterilization.

Figure 1:
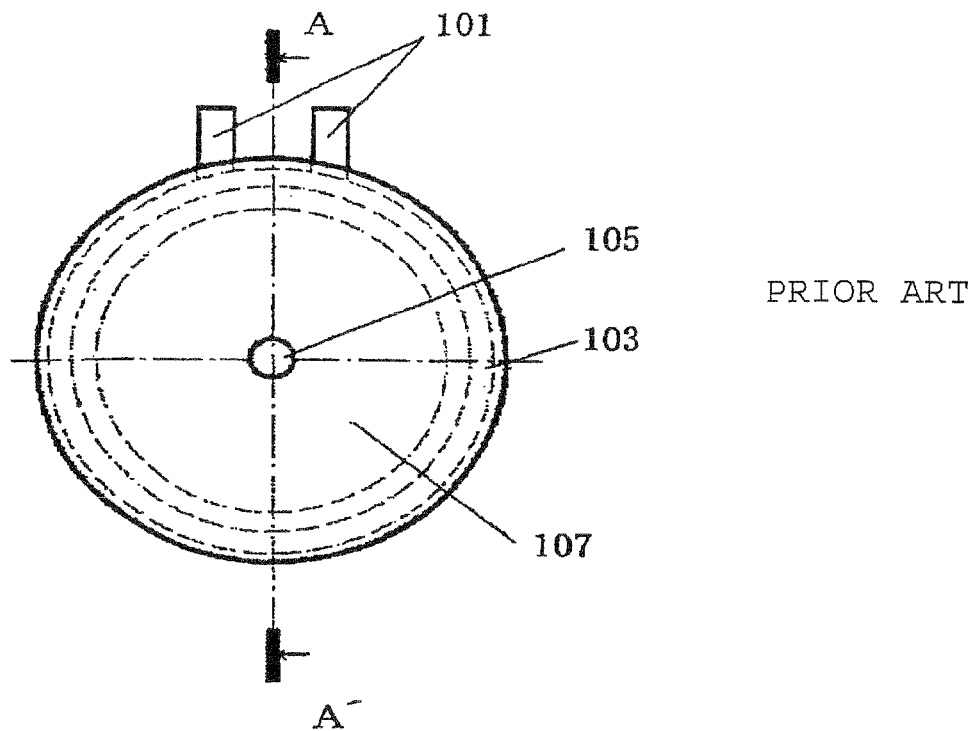
FIG. 1 shows a front view of a liquid-cooled motor according to the prior art.
Figure 2:
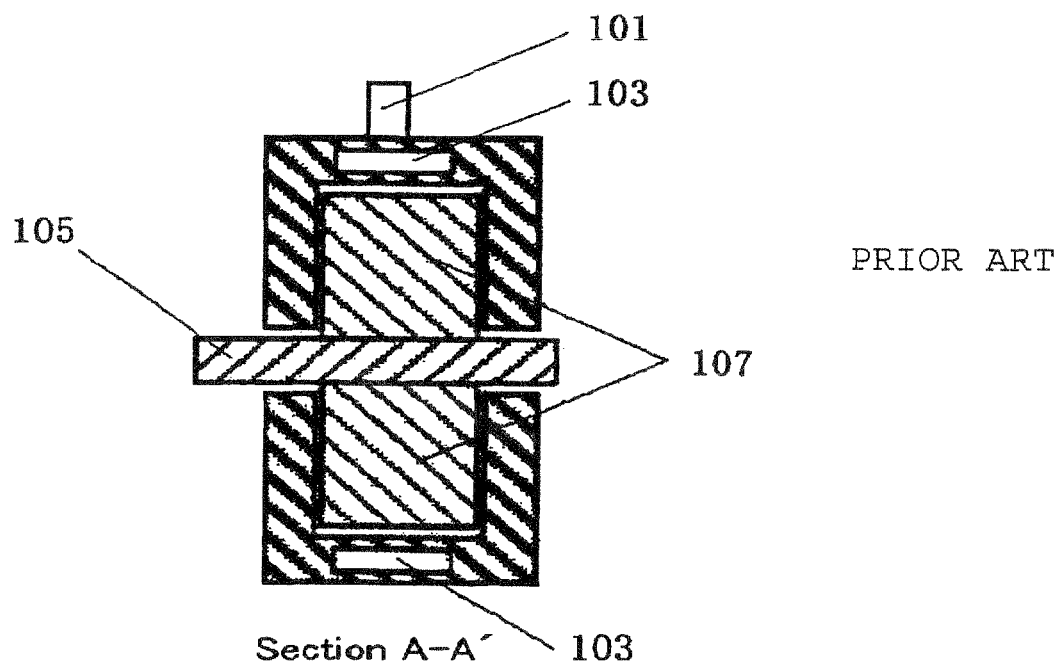
FIG. 2 shows a cross-sectional view of the liquid-cooled motor according to the prior art.
Figure 3:
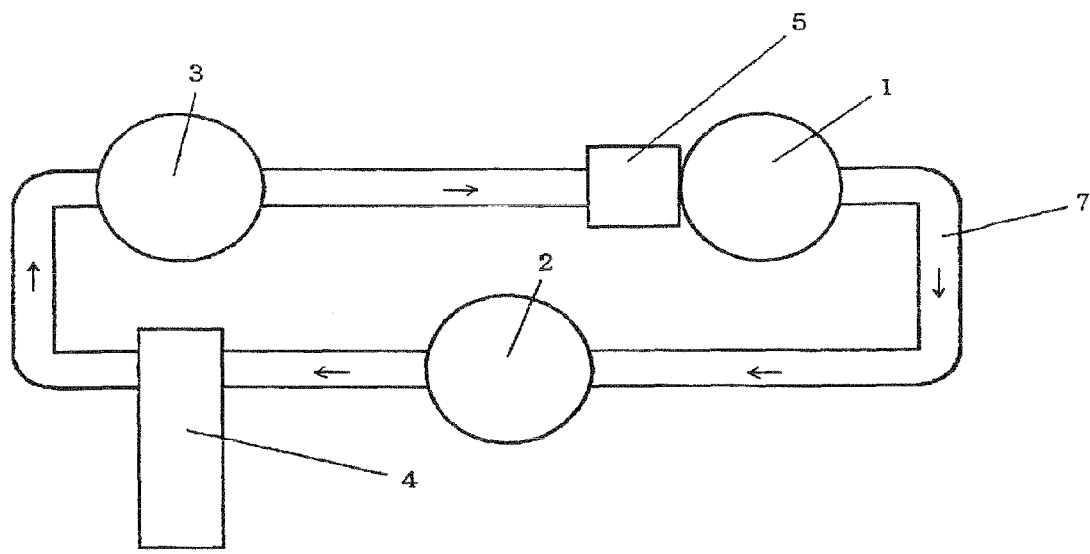
FIG. 3 shows a schematic illustration of a cooling system according to the present invention.
Figure 4:
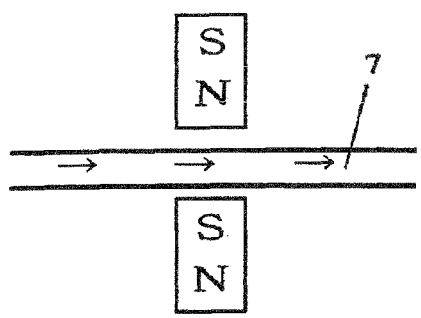
FIG. 4 shows a first embodiment of arrangement of magnets according to the present invention.
Figure 5:
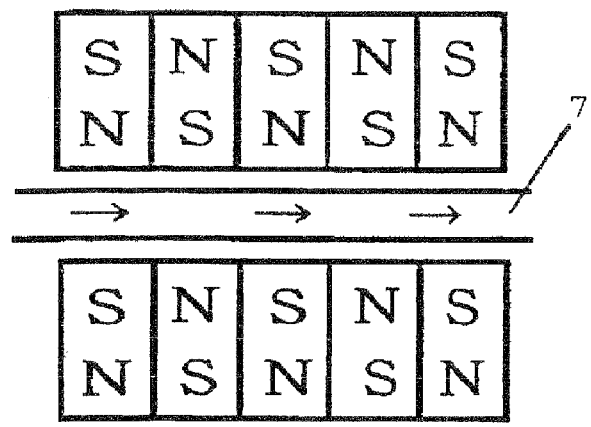
FIG. 5 shows a second embodiment of arrangement of magnets according to the present invention.
Figure 6:
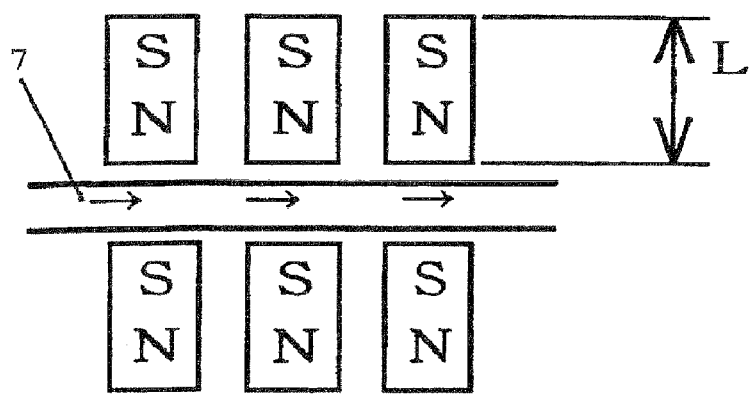
FIG. 6 shows a variant of the second embodiment of arrangement of magnets according to the present invention.
Figure 7:
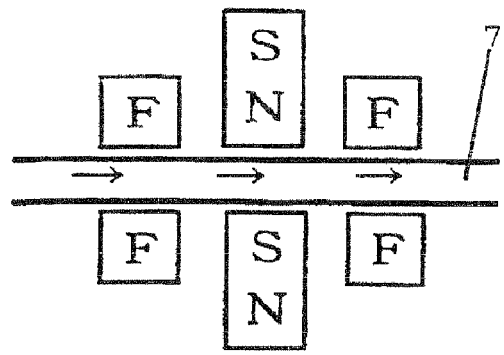
FIG. 7 shows a third embodiment of arrangement of magnets and far-infrared ray-generating stones according to the present invention.
Figure 8:
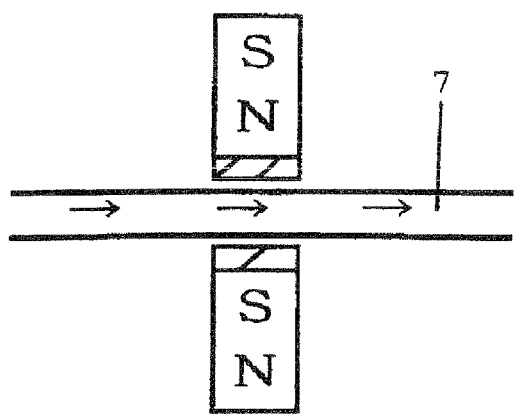
FIG. 8 shows a variant of the third embodiment of arrangement of magnets and far-infrared ray-generating stones according to the present invention.
Figure 9:
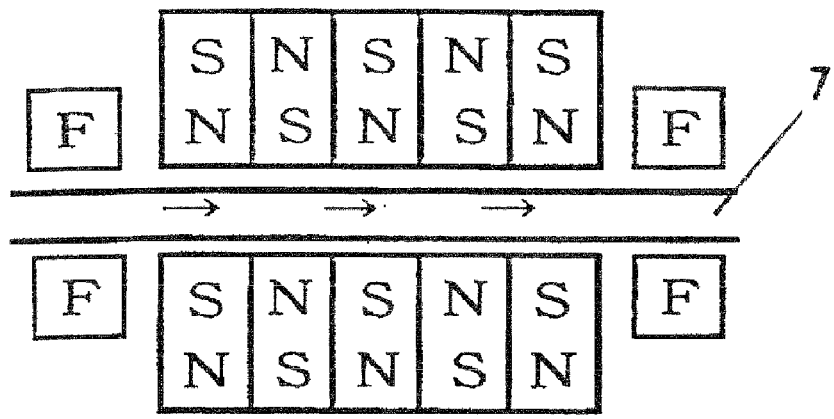
FIG. 9 shows a fourth embodiment of arrangement of magnets and far-infrared ray-generating stones according to the present invention.
Figure 10:
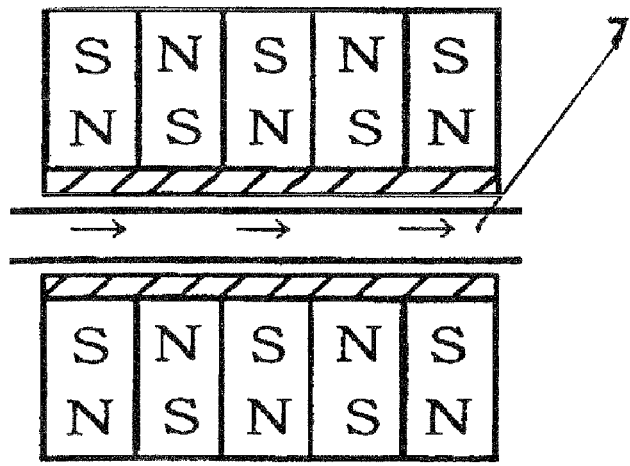
FIG. 10 shows a variant of the fourth embodiment of arrangement of magnets and far-infrared ray-generating stones according to the present invention.
Figure 11:
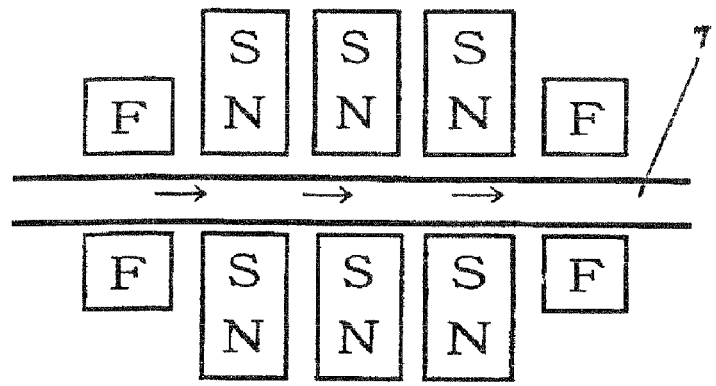
FIG. 11 shows another variant of the fourth embodiment of arrangement of magnets and far-infrared ray-generating stones according to the present invention.
Figure 12:
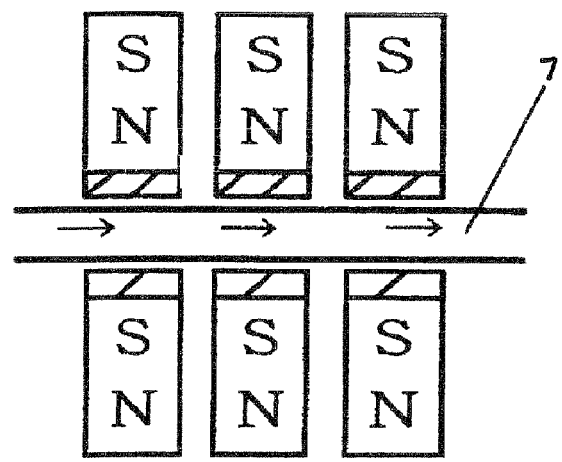
FIG. 12 shows another variant of the fourth embodiment of arrangement of magnets and far-infrared ray-generating stones according to the present invention.
Figure 13:
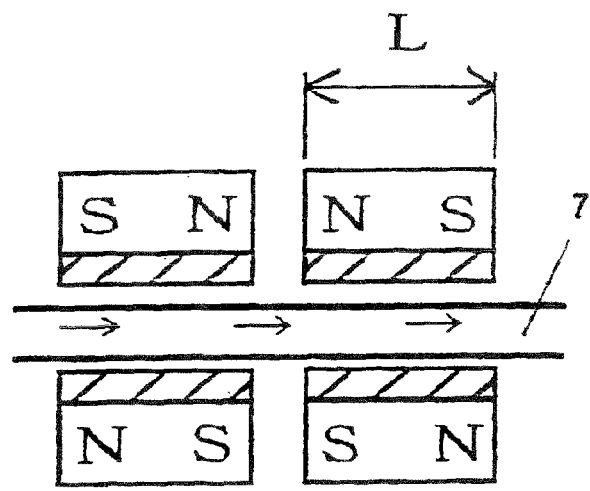
FIG. 13 shows another variant of the fourth embodiment of arrangement of magnets and far-infrared ray-generating stones according to the present invention.
Figure 14:
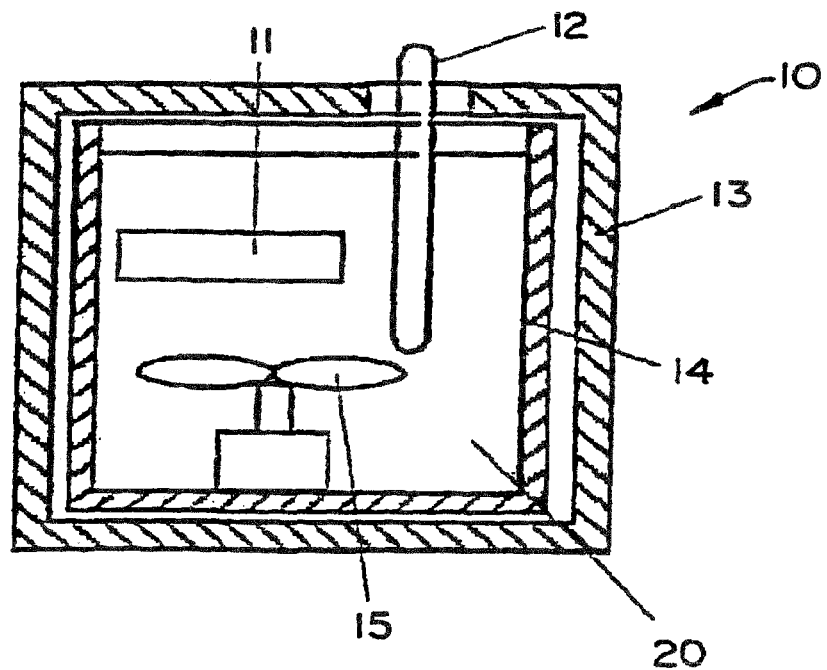
FIG. 14 shows a schematic illustration of a basic experimental apparatus for examining the principle of the present invention.
Figure 15:
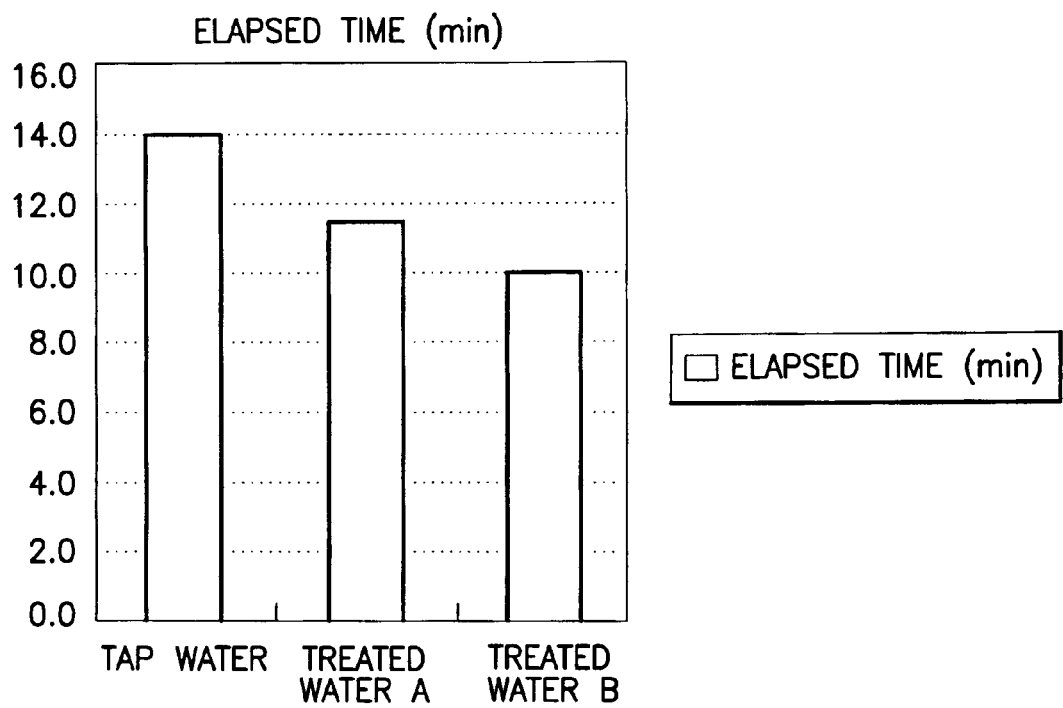
FIG. 15 shows results of temperature rises in constant heating experiments for tap water and treated water.
Figure 16:
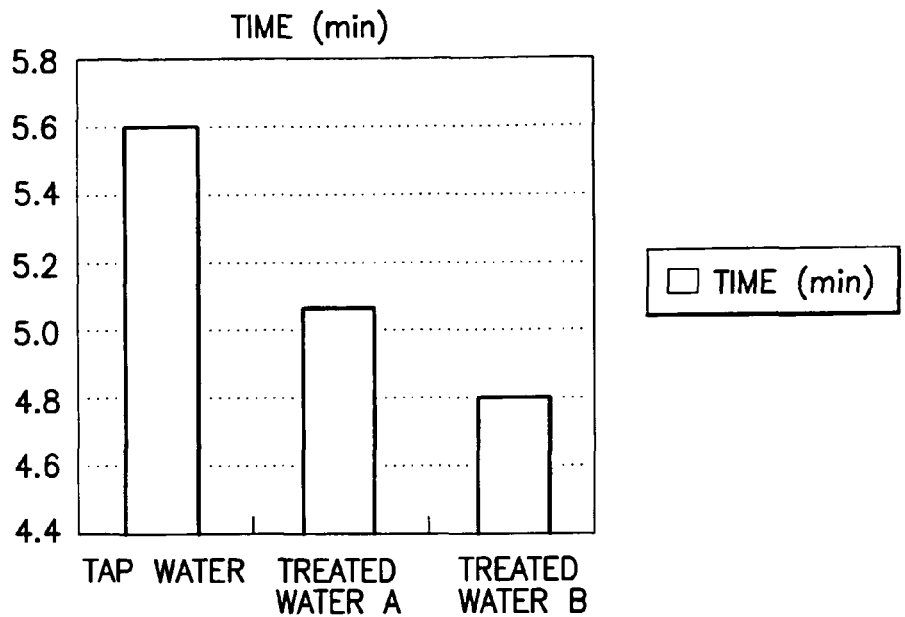
FIG. 16 shows treatment times in pumping-up experiments for tap water and treated water.
Figure 17:
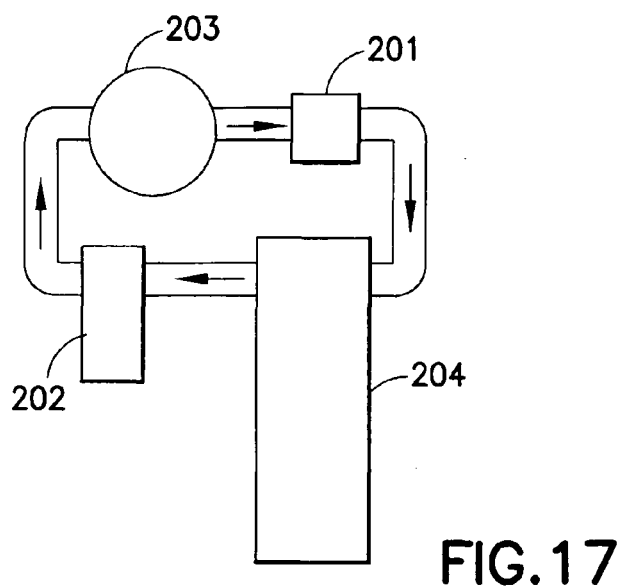
FIG. 17 shows a schematic illustration of a heat exchange medium system to which a magnetic member according to the present invention is mounted.
Figure 18:
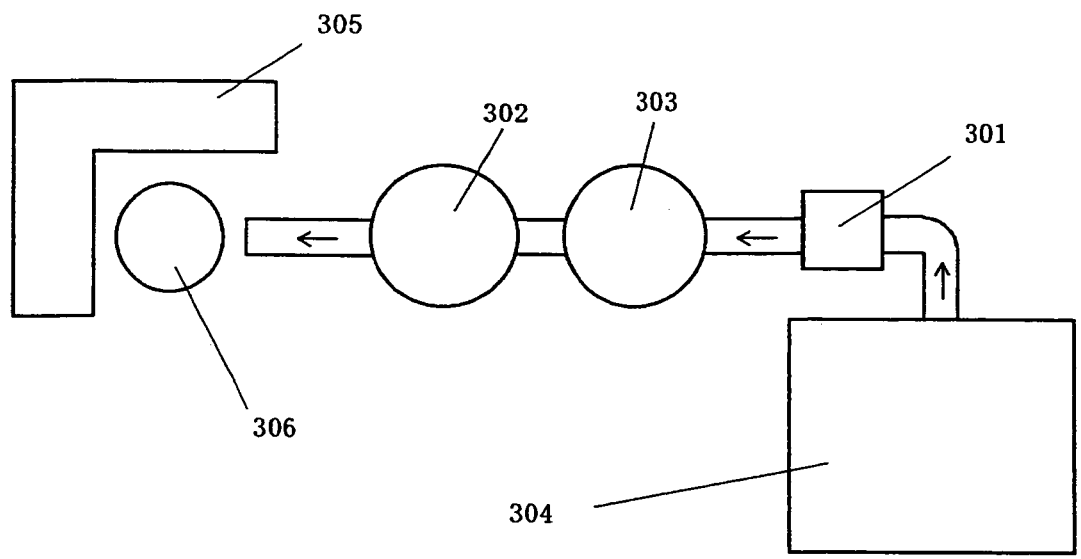
FIG. 18 shows a schematic illustration of a heat exchange medium system to which a magnetic member according to the present invention is mounted.
Figure 19:
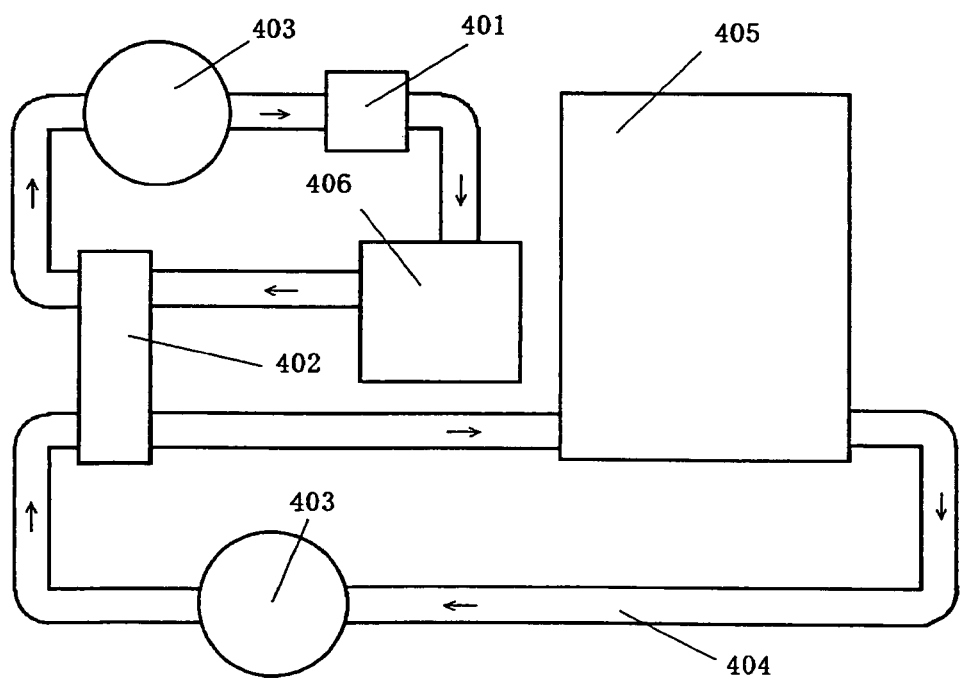
FIG. 19 shows a schematic illustration of a drinking water circulation system to which a magnetic member according to the present invention is mounted.
Figure 20:
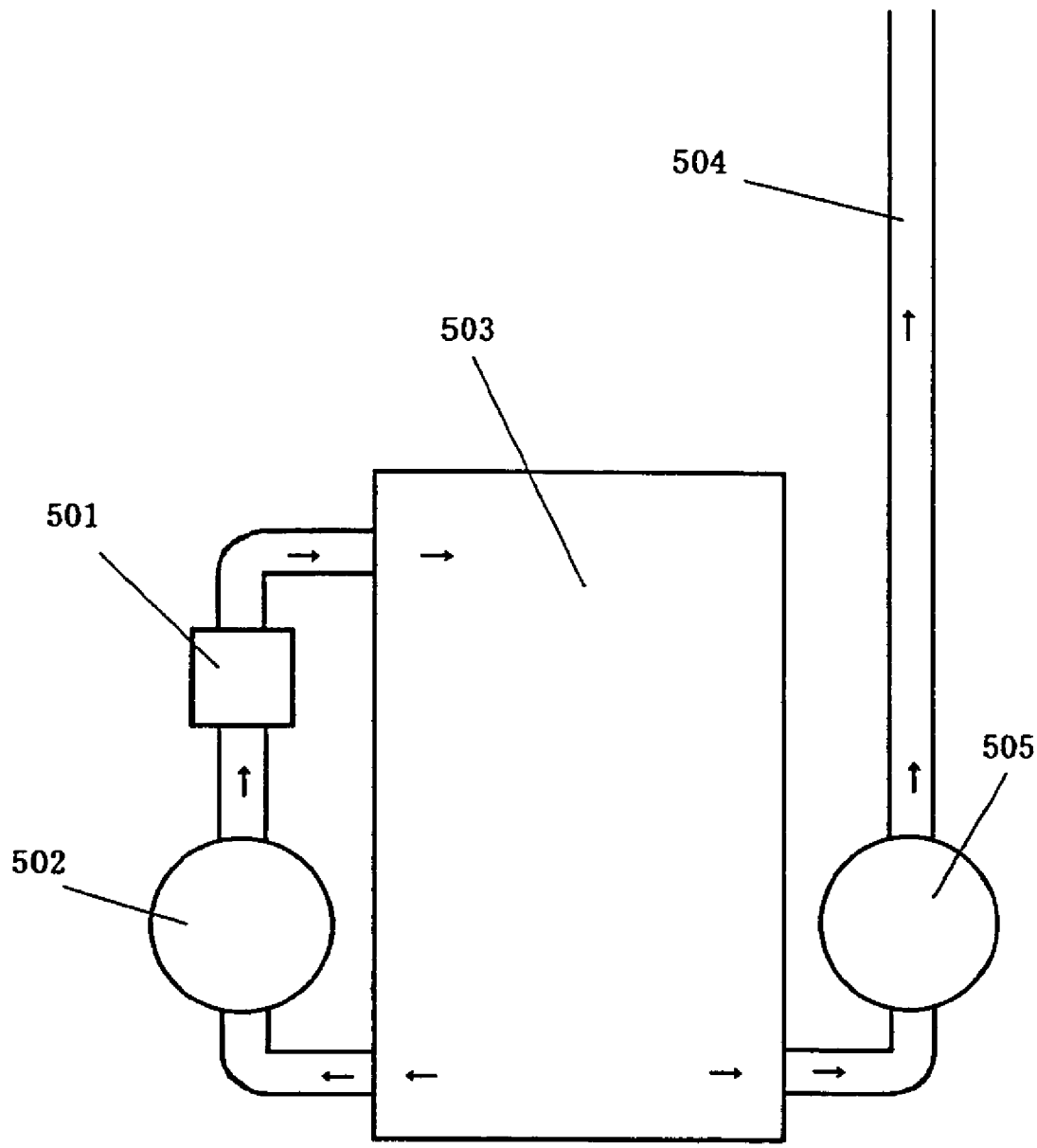
FIG. 20 shows a schematic illustration of a drinking water circulation system to which a magnetic member according to the present invention is mounted.
Figure 21:
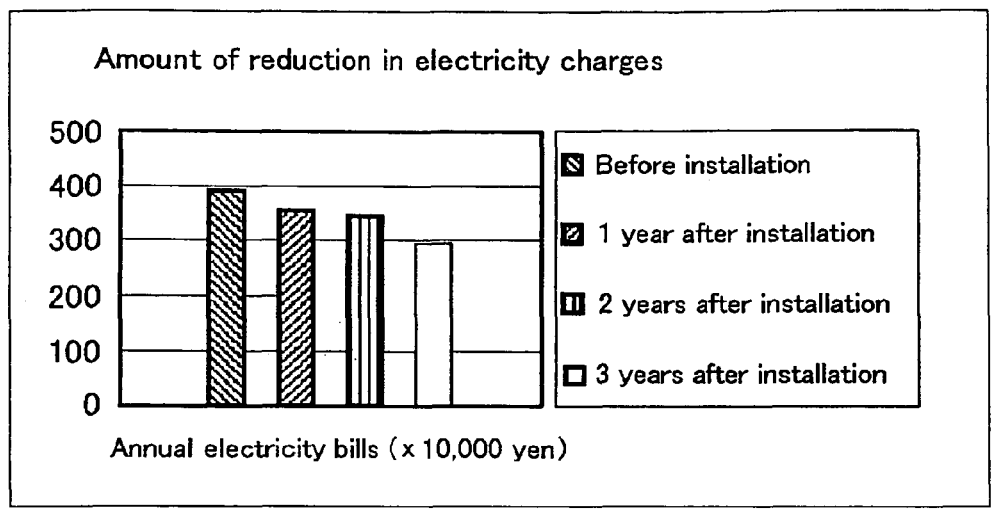
FIG. 21 shows a reduction in electricity charges according to the present invention.
Figure 22:
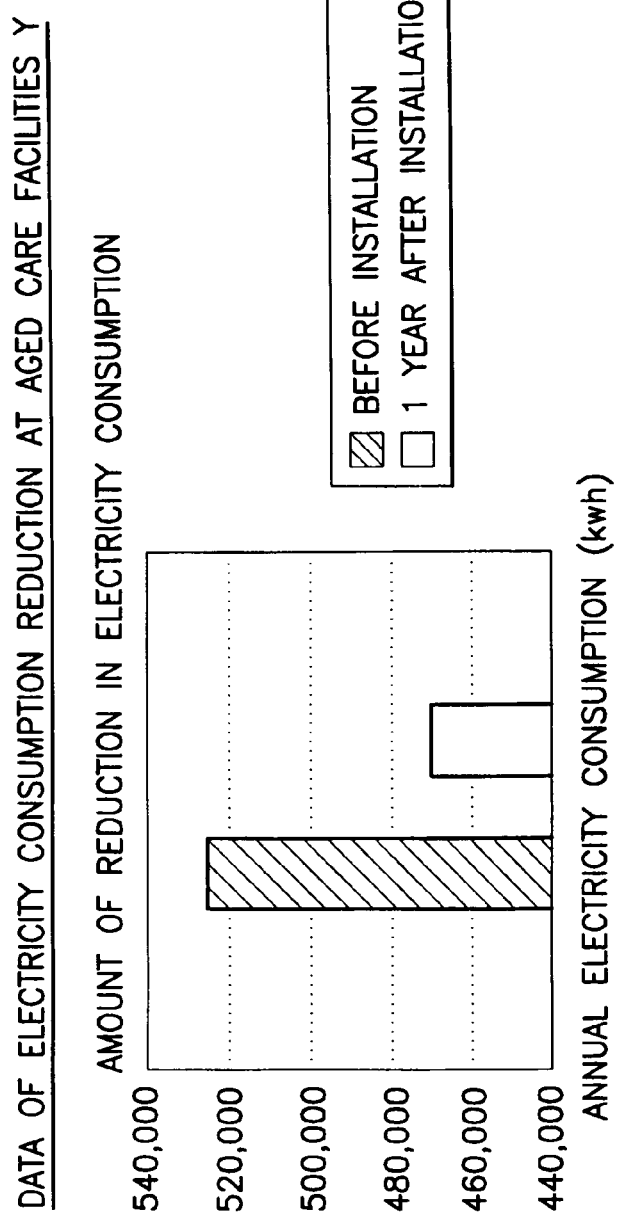
FIG. 22 shows a reduction in electricity charges according to the present invention.
Figure 23:
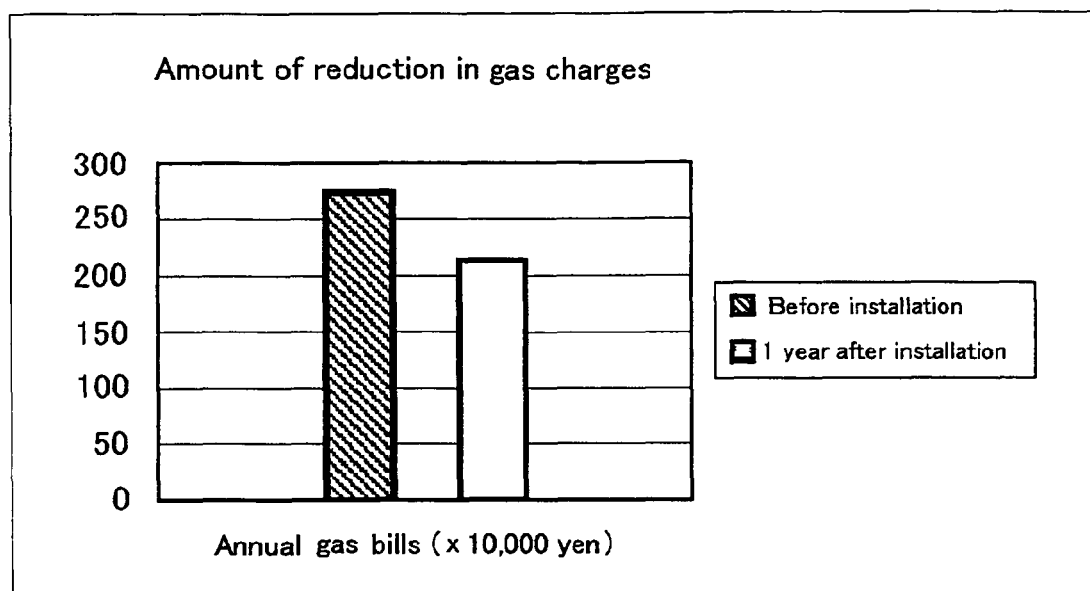
FIG. 23 shows a reduction in gas charges according to the present invention.
Figure 24:
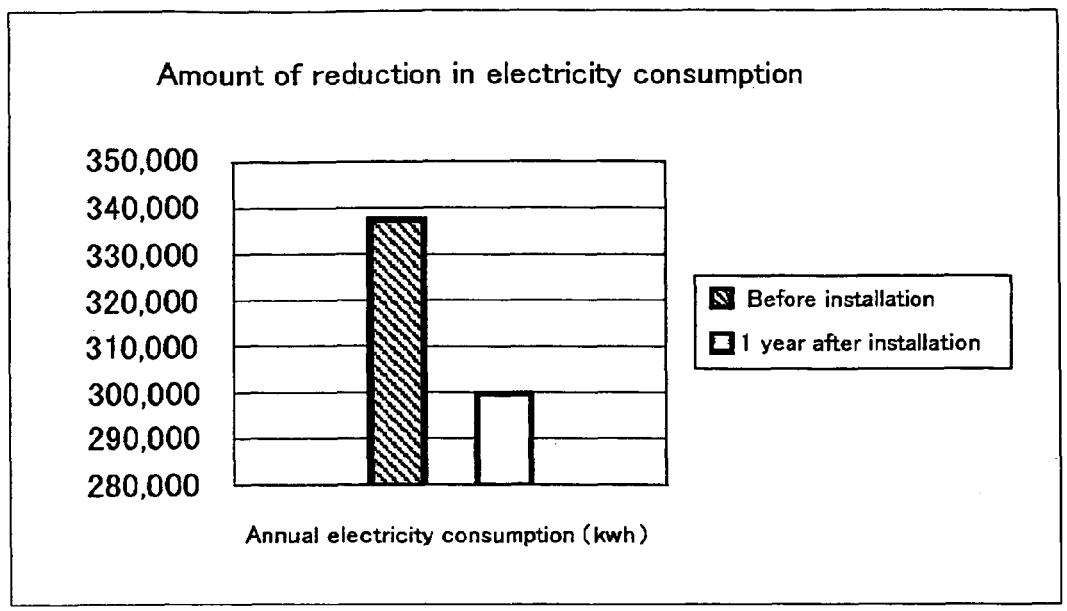
FIG. 24 shows a reduction in electricity consumption according to the present invention.
Figure 25:
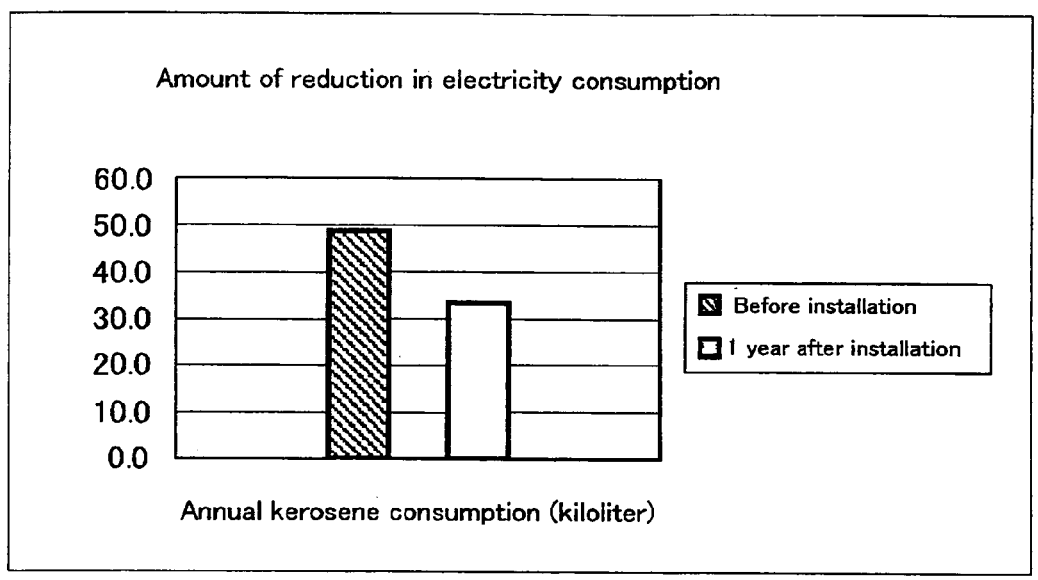
FIG. 25 shows a reduction in kerosene expenses according to the present invention.
Figure 26:
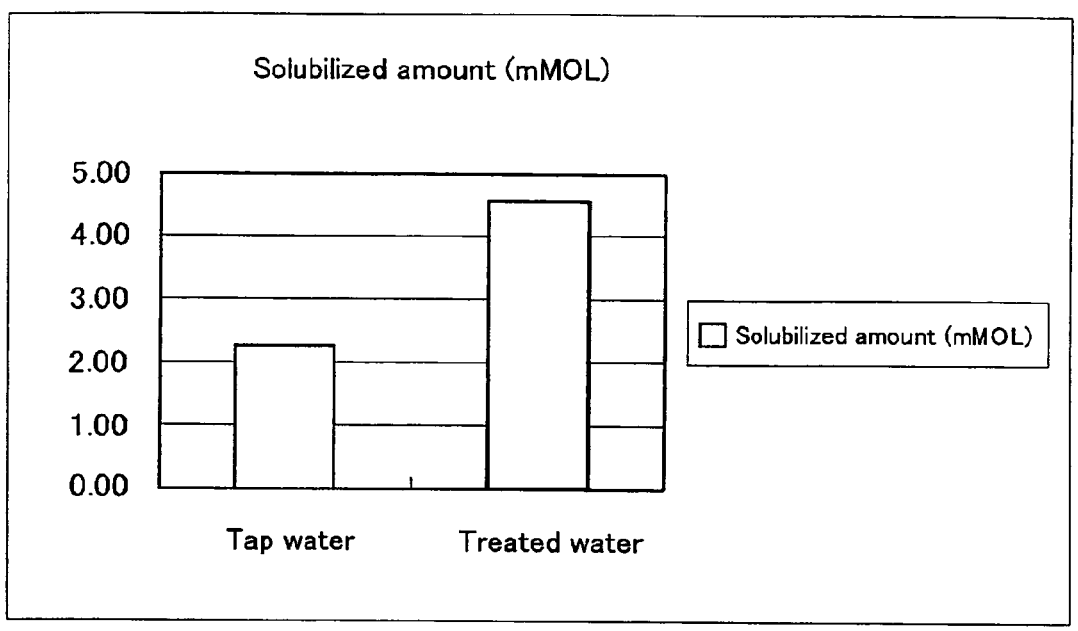
FIG. 26 shows an improvement in surface activity of water according to the present invention.
Figure 27:
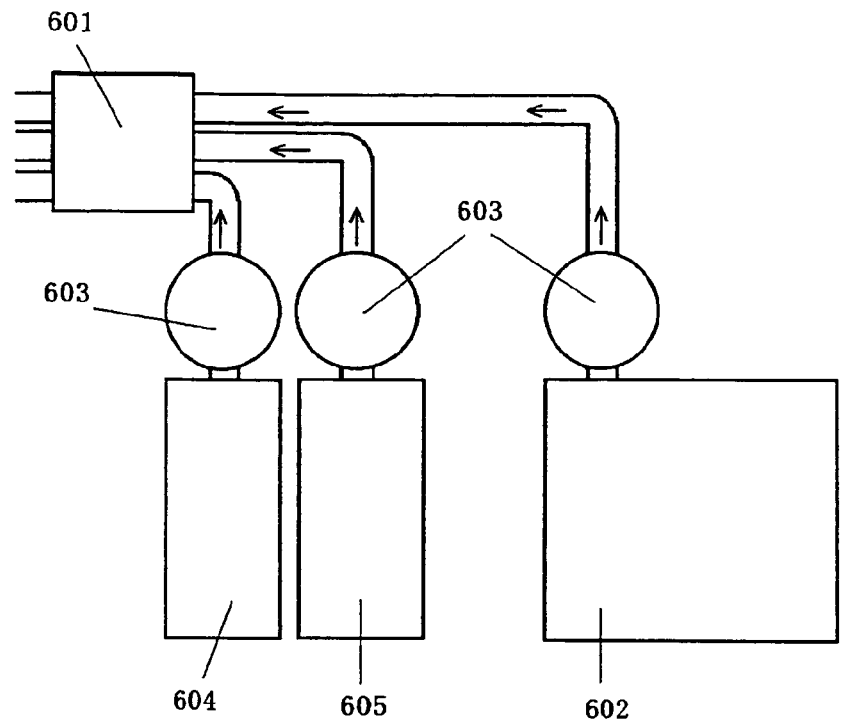
FIG. 27 shows a schematic illustration of a car wash to which a magnetic member according to the present invention is mounted.
Figure 28:
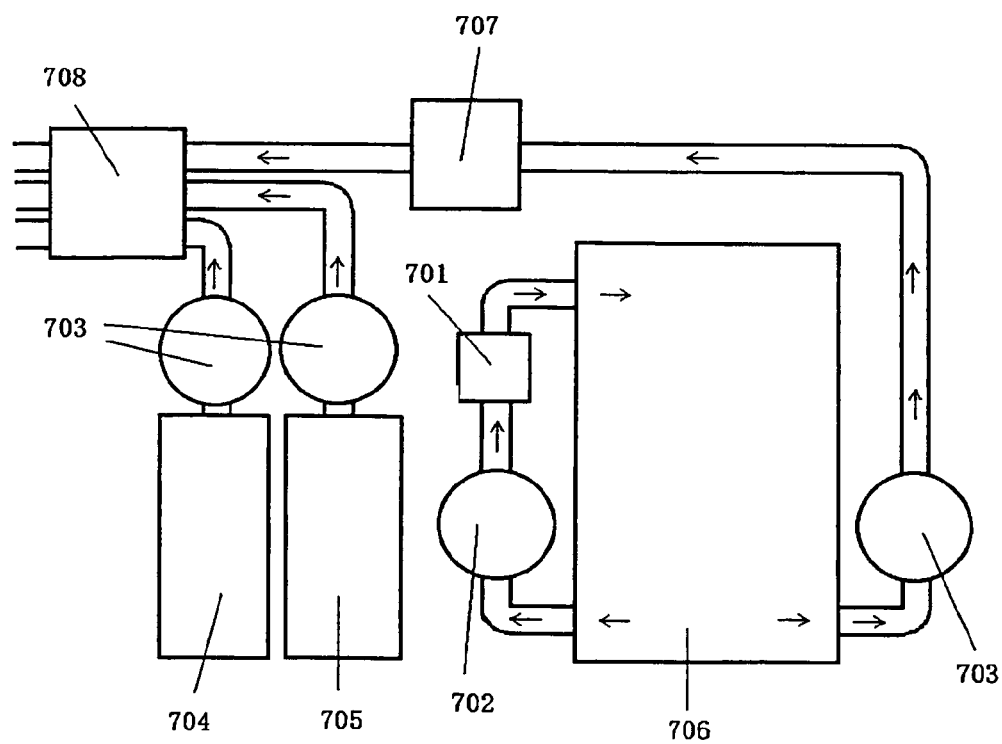
FIG. 28 shows a schematic illustration of a car wash to which a magnetic member according to the present invention is mounted.
Figure 29:
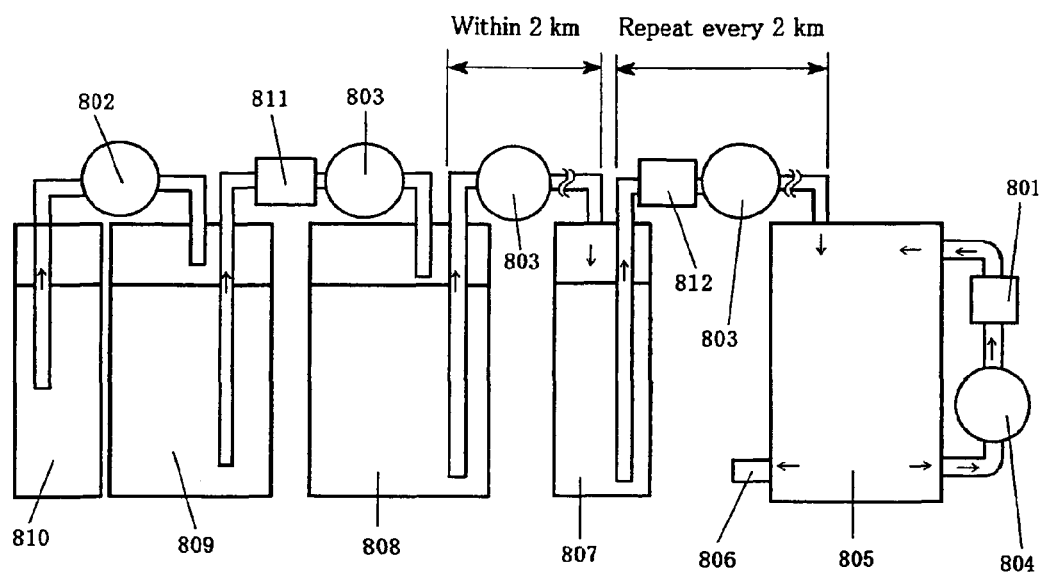
FIG. 29 shows a water pump-up system to which a magnetic member according to the present invention is mounted.

The invention claimed is:

1. A medium flow path to which a pump for circulating, pumping up or feeding is provided, to which magnetic members are further provided, the magnetic members generating a magnetic force in a direction substantially perpendicular to the flow direction in relation to the medium flow path, to such an extent that the magnetic flux density at the center of the flow path is set at 2,000 to 5,000 gausses, whereby the load on said pump is reduced,
   wherein far-infrared ray-generating members are provided in conjunction with the magnetic members and the wavelength of the far-infrared ray generated by the far-infrared ray-generating members is within ±10% of 1/N of a wavelength at which molecules of the cooling medium undergo resonance reaction, wherein N is a natural number.

2. The medium flow path according to claim 1, wherein the magnetic flux density at the center of the flow path is set at 2000 to 3,000 gausses.

3. The medium flow path according to claim 1, wherein the wavelengths of the far-infrared ray generated by the far-infrared ray-generating members is 5 to 25 micrometers.

4. The medium flow path according to claim 1, wherein the wavelengths of the far-infrared ray generated by the far-infrared ray-generating members is 6 to 18 micrometers.

5. The medium flow path according to claim 1, wherein the wavelengths of the far-infrared ray generated by the far-infrared ray-generating members is 8 to 14 micrometers.

6. The medium flow path according to claim 1, wherein the magnetic members are arranged in such a manner that mutually identical magnetic poles are juxtaposed or mutually different magnetic poles are alternately juxtaposed at a portion where the members are mounted along the medium flow path.

* * * * *